US012380518B2

(12) United States Patent
Stephen et al.

(10) Patent No.: US 12,380,518 B2
(45) Date of Patent: Aug. 5, 2025

(54) SLOT BASED ALLOCATION FOR FUELING

(71) Applicant: Wayne Fueling Systems LLC, Austin, TX (US)

(72) Inventors: Aneesh Maria Stephen, Tamil Nadu (IN); Ravi Kumar Kattimani, Karnataka (IN); Anil Kumar Peddireddy, Lombard, IL (US)

(73) Assignee: Wayne Fueling Systems LLC, Austin, TX (US)

( * ) Notice: Subject to any disclaimer, the term of this patent is extended or adjusted under 35 U.S.C. 154(b) by 607 days.

(21) Appl. No.: 17/699,010

(22) Filed: Mar. 18, 2022

(65) Prior Publication Data

US 2023/0298112 A1  Sep. 21, 2023

(51) Int. Cl.
*G06Q 50/06* (2024.01)
*G01C 21/36* (2006.01)
*G06Q 10/02* (2012.01)
*G08G 1/0968* (2006.01)

(52) U.S. Cl.
CPC ......... *G06Q 50/06* (2013.01); *G01C 21/3679* (2013.01); *G06Q 10/02* (2013.01); *G08G 1/0968* (2013.01)

(58) Field of Classification Search
CPC .................................................. G06Q 10/02
See application file for complete search history.

(56) References Cited

U.S. PATENT DOCUMENTS

| | | | | |
|---|---|---|---|---|
| 2012/0067457 | A1* | 3/2012 | Reeder | G07F 13/025 141/98 |
| 2015/0046200 | A1* | 2/2015 | Chihara | G06Q 10/02 705/5 |
| 2017/0108344 | A1* | 4/2017 | Shinde | G06Q 20/322 |
| 2017/0148113 | A1* | 5/2017 | Yasko | G06Q 40/04 |
| 2019/0130318 | A1* | 5/2019 | Lee | G06Q 50/40 |
| 2021/0049519 | A1* | 2/2021 | Cun | G06Q 10/06312 |
| 2022/0187091 | A1* | 6/2022 | Suzuki | G08G 1/00 |

OTHER PUBLICATIONS

ChargePoint.com, "Coulomb Technologies Furthers Innovation on the ChargePoint Network: Announces Industry-First Charging Station Reservation System," Apr. 2011, Retrieved from https://www.chargepoint.com/about/news/coulomb-technologies-furthers-innovation-chargepoint-network-announces-industry-first (Year: 2011).*

* cited by examiner

*Primary Examiner* — Rupangini Singh
*Assistant Examiner* — Bryan J Kirk
(74) *Attorney, Agent, or Firm* — Mintz, Levin, Cohn, Ferris, Glovsky and Popeo, P.C. US

(57) ABSTRACT

In one aspect, data characterizing fueling station user's location relative to a fueling station, a time slot of availability of a fuel dispenser at the fueling station, and a configuration of the fuel dispenser for fuel dispensing operations can be received. An arrival time of the fueling station user at the fueling station can be determined based on the location data. A selection prompt characterizing the fuel dispenser configuration data can be determined, and the selection prompt can include a field for specifying an operating parameter of the fuel dispenser. Selection data characterizing the operating parameter can be determined in response to an input of the operating parameter into the field. A fueling station allocation can be determined based on the arrival time, the time slot data, and the selection data. The fueling station allocation can be provided. Related apparatus, systems, methods, techniques, and articles are also described.

23 Claims, 11 Drawing Sheets

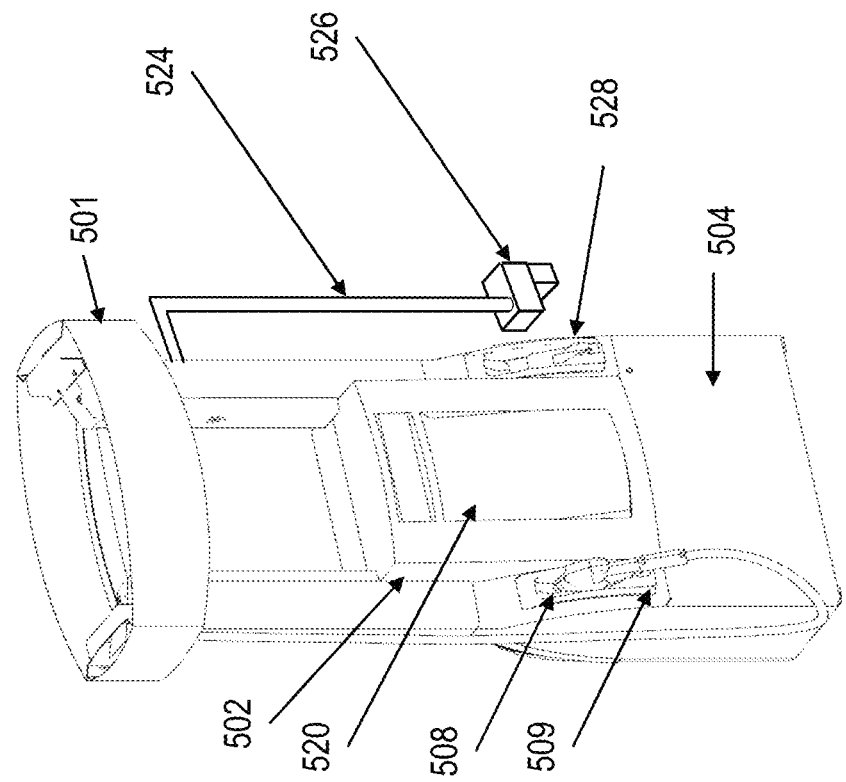
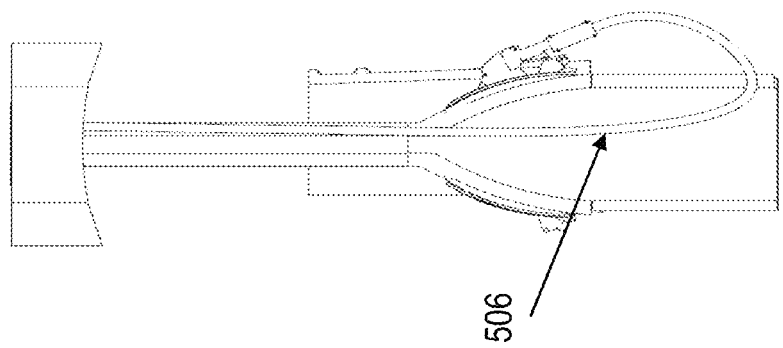
FIG. 5A
FIG. 5B

SLOT BASED ALLOCATION FOR FUELING

FIELD

The current subject matter relates to systems, methods, and devices for slot-based allocation for fueling.

BACKGROUND

At present, when a fueling station user arrives at a fueling station to refuel or recharge their vehicle, the user must quickly determine whether there are any open fuel dispensers and/or charging stations and maneuver their vehicle to an unoccupied dispenser/charging station to begin the fueling/charging process. During peak refueling/recharging times, a user may not be able to find an unoccupied dispenser/charging station when they arrive at the fueling station and be forced to wait until a dispenser/charging station becomes available. In addition, in some instances, multiple fueling station users may attempt to maneuver their vehicles to the same dispenser/charging station, which can increase the risk of a vehicular accident involving the two vehicles and/or other vehicles/pedestrians at the fueling station.

Additionally, at present, authorization of payment for fuel/electric charging and other goods/services available at fueling stations occurs when the fueling station user is at the fueling station. For example, to purchase fuel/charging and other goods/services, a fueling station user will either provide their payment information at the fuel dispenser/charging station or leave their vehicle to proceed to the on-site store to provide their payment information to the fueling station attendant located therein. In addition, selection of the desired fuel/electric charging and other goods/services occurs while the user is at the fueling station (i.e., not prior to their arrival), which can in an increased amount of time the user needs to spend at the fueling station. This can result in increased traffic congestion at the fueling station and, as a result, increased safety risks to the fueling station users and/or attendants at the fueling station.

SUMMARY

In general, systems, methods, and devices for slot-based allocation for fueling on are provided.

In one aspect, data characterizing a location of a fueling station user relative to a fueling station, a time slot of availability of a fuel dispenser at the fueling station during which the fuel dispenser is available to dispense fuel to the fueling station user, and a configuration of the fuel dispenser for fuel dispensing operations can be received. An arrival time of the fueling station user at the fueling station can be determined based on the received location data, and the arrival time can characterize a time at which the fueling station user is estimated to arrive at the fueling station. A selection prompt that characterizes the received fuel dispenser configuration data can be determined, and the selection prompt can include a field for specifying an operating parameter of the fuel dispenser. Selection data that characterizes the operating parameter can be determined in response to an input of the operating parameter into the field. A fueling station allocation for the fueling station user can be determined based on the determined arrival time, the received time slot data, and the determined selection data. The fueling station allocation can characterize a slot of time during which the fuel dispenser is allocated to the fueling station user for the dispensing of fuel from the fuel dispenser. The fueling station allocation can be provided.

One or more of the following features can be included in any feasible combination. For example, an allocation prompt characterizing the fueling station and the determined fueling station allocation can be determined, and the allocation prompt can be configured to be presented on an interactive display of a client device. For example, the allocation prompt can be provided to the interactive display for depiction thereby. For example, data characterizing a selection of the fueling station allocation by the fueling station user can be received from the interactive display, a fueling station layout map can be determined based on the fueling station allocation selection data, the fueling station layout map can graphically indicate a location of the fuel dispenser corresponding to the selected fueling station allocation, and the fueling station layout map can be provided to the interactive display for depiction thereby. For example, updated location data characterizing an updated location of the fueling station user relative to the fueling station can be received. For example, an updated arrival time of the fueling station user at the fueling station can be determined based on the received updated location data, and the updated arrival time can characterize an updated time at which the fueling station user is expected to arrive at the fueling station. For example, a determination of whether a quantity of fuel to be dispensed by the fuel dispenser can be dispensed within the slot of time of the fueling station allocation can be made, and, in response to determining that the quantity of fuel cannot be dispensed by the fuel dispenser within the slot of time of the fueling station allocation, the fueling station allocation can be disassociated from the fueling station user. For example, in response to determining that the quantity of fuel cannot be dispensed by the fuel dispenser within the slot of time of the fueling station allocation, an updated fueling station allocation for the fueling station user can be determined based on the determined updated arrival time, the received time slot data, and the received fuel dispenser configuration data, and the updated fueling station allocation can include an updated slot of time during which the fuel dispenser is allocated to the fueling station user for the dispensing of fuel from the fuel dispenser. For example, an updated prompt characterizing the updated fueling station allocation and configured to be presented on the interactive display can be determined, and the updated prompt can be provided to the interactive display for depiction thereby. For example, item data characterizing a good or service to be acquired by the fueling station user while at the fueling station can be received, and the fueling station allocation can be determined based on the received item data. For example, an item retrieval prompt can be determined based on the received item data, the item retrieval prompt can characterize the good or service to be acquired, and the item retrieval prompt can be configured to be presented on a display of a convenience store terminal located at a convenience store of the fueling station. For example, the item retrieval prompt can be provided to the display of the convenience store terminal for depiction thereby. For example, a unique identifier code that characterizes the fueling station allocation can be determined, a code prompt that includes the unique identifier code and that is configured to be presented on the interactive display can be determined, and the code prompt can be provided to the interactive display for depiction thereby. For example, the unique identifier code can be provided to the fuel dispenser, and, in response to determining that the unique identifier code included in the code prompt matches the unique identifier code provided to the fuel dispenser, the fuel dispenser can dispense fuel. For example, in response to determining that the unique identifier code included in the code prompt matches the unique identifier code provided to the fuel dispenser, a fueling summary prompt configured to be presented on a display of the fuel dispenser can be determined, and the fueling summary prompt can characterize the fuel dispenser configuration data, the fueling station allocation, and an availability status of a product that is available at the fueling station. For example, in response to determining the fueling station allocation, the fuel dispenser can be locked at a start time of the slot of time. For example, data characterizing an authorization to dispense fuel from the fuel dispenser can be received, and the authorization can indicate that the fueling station user has arrived at the fuel dispenser. For example, the fuel dispenser can be enabled for the dispensing of fuel to the fueling station user based on the received authorization data. For example, a fuel prompt characterizing the fueling station and a unit price of a grade of fuel available at the fueling station can be determined. For example, a fuel prompt map overlay that overlays the determined fuel prompt on an electronic map at the location of the fueling station can be determined, and the fuel prompt map overlay can be configured to be presented on an interactive display. For example, the fuel prompt map overlay can be provided to the interactive display for depiction thereby. For example, the fuel dispenser can be configured to dispense the fuel based on the received fuel dispenser configuration data.

In another aspect, a system is provided and can include at least one data processor and memory storing instructions configured to cause the at least one data processor to perform operations described herein. The operations can include receiving data characterizing a location of a fueling station user relative to a fueling station, a time slot of availability of a fuel dispenser at the fueling station during which the fuel dispenser is available to dispense fuel to the fueling station user, and a configuration of the fuel dispenser for fuel dispensing operations; determining an arrival time of the fueling station user at the fueling station based on the received location data, the arrival time characterizing a time at which the fueling station user is estimated to arrive at the fueling station; determining a selection prompt that characterizes the received fuel dispenser configuration data, the selection prompt including a field for specifying an operating parameter of the fuel dispenser; determining selection data that characterizes the operating parameter in response to an input of the operating parameter into the field; determining a fueling station allocation for the fueling station user based on the determined arrival time, the received time slot data, and the determined selection data, the fueling station allocation characterizing a slot of time during which the fuel dispenser is allocated to the fueling station user for the dispensing of fuel from the fuel dispenser; and providing the fueling station allocation.

One or more of the following features can be included in any feasible combination. For example, the operations can further include determining an allocation prompt characterizing the fueling station and the determined fueling station allocation, the allocation prompt configured to be presented on an interactive display of a client device; and providing the allocation prompt to the interactive display for depiction thereby. For example, the operations can further include receiving, from the interactive display, data characterizing a selection of the fueling station allocation by the fueling station user; determining a fueling station layout map based on the fueling station allocation selection data, the fueling station layout map graphically indicating a location of the fuel dispenser corresponding to the selected fueling station allocation; and providing the fueling station layout map to the interactive display for depiction thereby. For example, the operations can further include receiving updated location data characterizing an updated location of the fueling station user relative to the fueling station; determining an updated arrival time of the fueling station user at the fueling station based on the received updated location data, the updated arrival time characterizing an updated time at which the fueling station user is expected to arrive at the fueling station; determining whether a quantity of fuel to be dispensed by the fuel dispenser can be dispensed within the slot of time of the fueling station allocation; and, in response to determining that the quantity of fuel cannot be dispensed by the fuel dispenser within the slot of time of the fueling station allocation, disassociating the fueling station allocation from the fueling station user. For example, the operations can further include determining a unique identifier code that characterizes the fueling station allocation; determining a code prompt that includes the unique identifier code and is configured to be presented on the interactive display; and providing the code prompt to the interactive display for depiction thereby. For example, the operations can further include providing the unique identifier code to the fuel dispenser; and in response to determining that the unique identifier code included in the code prompt matches the unique identifier code provided to the fuel dispenser, causing the fuel dispenser to dispense fuel.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 5A is a side perspective view of one embodiment of a fuel dispenser;

FIG. 5B is a front perspective view of the fuel dispenser shown in FIG. 5A; and

DETAILED DESCRIPTION

Figure 1:
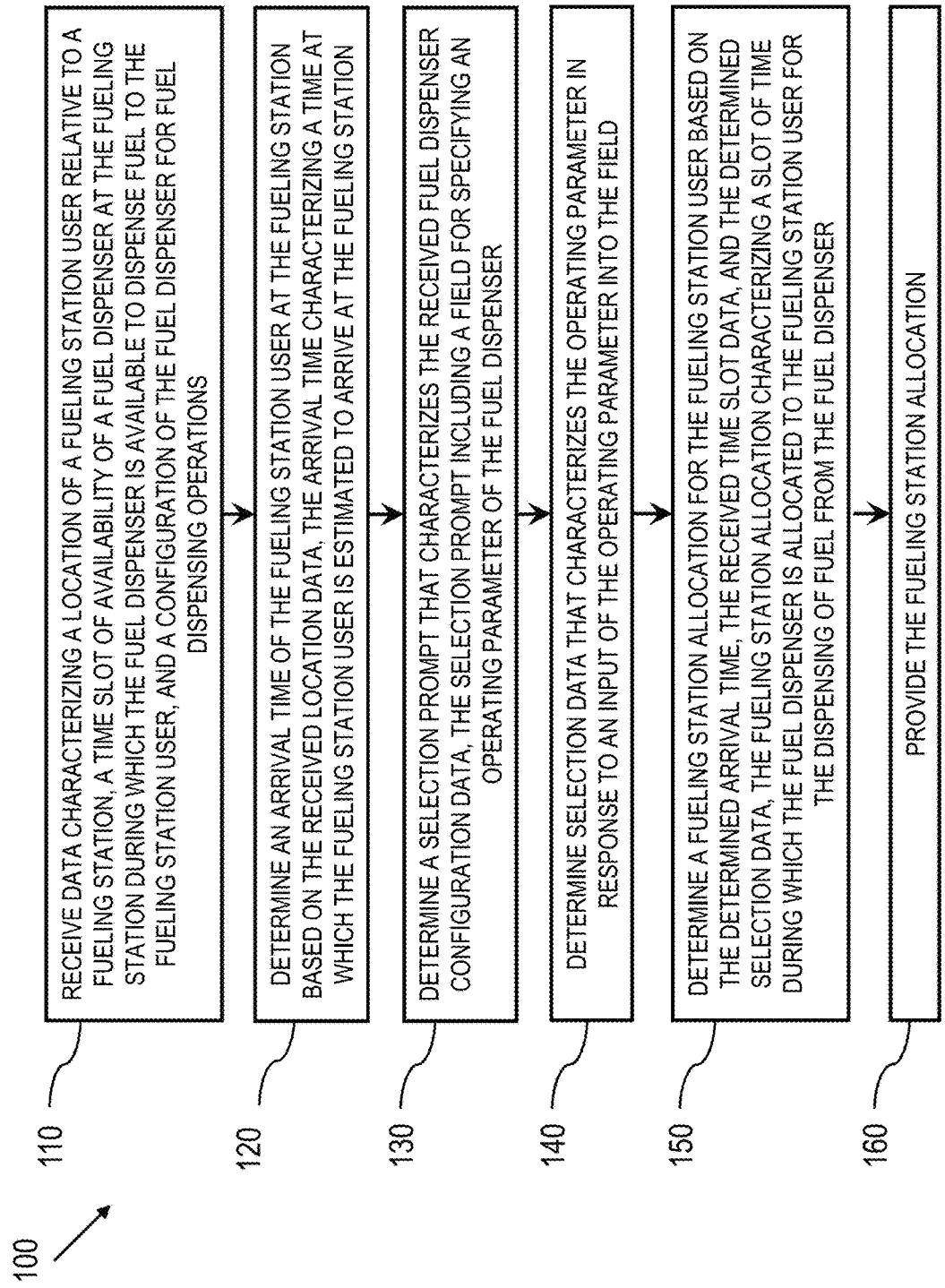
FIG. 1 is a process flow diagram illustrating an example process of some implementations of the current subject matter that can provide for slot-based allocation for fueling at a fueling station.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the size and shape of components with which the systems and devices will be used, and the methods in which the systems and devices will be used.

Some implementations of the current subject matter relate to providing a system for real-time, slot-based allocation for fueling that is based at least on a fueling station user's distance from the fueling station, the fueling station user's desired fuel to be acquired from a fuel dispenser at the fueling station, and the availability of a fuel dispenser for use by the fueling station user at the time the fueling station user is anticipated to arrive at the fueling station. A system incorporating the current subject matter can receive location data that characterizes a location of the fueling station user relative to the fueling station, a time slot of availability of a fuel dispenser at the fueling station during which the fuel dispenser is available to dispense fuel to the fueling station user, and fueling configuration parameters, such as a quantity and/or a type of fuel to be obtained by the fueling station user from the fuel dispenser. In some implementations, the data can be received by a client device of the fueling station user (e.g., a mobile device, in-car display, etc.). An arrival time of the fueling station user at the fueling station can be determined by the system based on the received location data. The system can determine a selection prompt, for presentation to the fueling station user on an interactive display of the client device, that characterizes the received fueling configuration parameters, and the system can receive selection data characterizing the fueling station user's desired fueling configuration parameters for their upcoming use of the fuel dispenser. The system can also determine a fueling station allocation, based on the determined arrival time, the received time slot data, and the received selection data, that characterizes an allotted slot of time in the future during which the fuel dispenser is allocated to the fueling station user for the dispensing of fuel from the fuel dispenser once they arrive at the fueling station. The system can determine a graphical prompt that characterizes the fueling station allocation and present the prompt to the fuel dispenser user on an interactive display of the client device.

Based on the graphical prompt, and by interacting with the interactive display of the client device, the fueling station user can select the fueling station allocation and thereby reserve the fuel dispenser for their use during the once they arrive at the fueling station, and data characterizing the selection of the fueling station allocation and the selection data can be transmitted from the personal electronic device and provided to the fuel dispenser. The fuel dispenser can use the provided selection data to configure the fuel dispenser for the dispensing of fuel to the fueling station user, in accordance with their selection once they arrive at the fueling station. In addition, the system can "lock" the fuel dispenser prior to the allotted slot of time such that it is exclusively reserved for use by the fueling station user during the allotted slot of time.

The client device can generate a unique code that can be used by the fueling station user to "unlock" the fuel dispenser during the allotted slot of time. When the fueling station allocation is selected by the fueling station user, the client device can provide the unique code with the fueling station allocation to the fuel dispenser, and the client device can present the unique code to the fueling station user on its display. When the fueling station user arrives at the fueling station to use the fuel dispenser during the allotted slot of time, the fueling station user can provide the unique code generated by the personal electronic device to the fuel dispenser. The fuel dispenser can compare the unique code provided by the fueling station user with the previously-provided unique code, and, if the codes match, the fuel dispenser will "unlock" for fuel dispensing. By providing a fueling station user with the ability to remotely select fuel dispenser configuration parameters and to reserve an allocated time of use of the fuel dispenser via their personal electronic device prior to their arrival at the fueling station, such a system can provide for enhanced control and operation of the fuel dispenser by the fueling station user and for the enhanced safety of all fueling station users and of the fueling station attendant(s) present at the fueling station.

FIG. 1 is a process flow diagram illustrating an example process 100 of some implementations of the current subject matter that can provide for slot-based allocation for fueling at a fueling station.

At 110, data characterizing a location of a fueling station user relative to a fueling station, a time slot of availability of a fuel dispenser at the fueling station during which the fuel dispenser is available to dispense fuel to the fueling station user, and a configuration of the fuel dispenser for fuel dispensing operations can be received.

In some implementations, the location data can be received from a location sensor (e.g., a Global Positioning Systems ("GPS") sensor) that is incorporated into the client device (e.g., mobile device, vehicle head unit, etc.) of the fueling station user. For example, in some implementations, the location sensor can acquire data characterizing the location of the client device and/or provide the data characterizing the location of the client device to a processor of the client device for one or more of the operations described herein. As such, given that the client device can typically be in close proximity to the fueling station user when the fueling station user is in transit to the fueling station, the location of the client device can serve as a proxy for a location of the fueling station user. In some implementations, the location data can characterize the coordinates at which the client device of the fueling station user is located.

In some implementations, the time slot data can be determined by a fueling station store controller that is located at the fueling station and configured to acquire, from a forecourt controller located at the fueling station and in operable communication with the fuel dispenser, data that characterizes the availability of the fuel dispenser for fuel dispensing operations and/or the acquisition of goods/services from the fueling station store. From the acquired availability data, the fueling station store controller can determine one or more future windows of time during which the fueling station user can occupy the fuel dispenser for obtaining fuel and/or for acquiring the goods/services from the fueling station store, and the determined windows of time can be included in the time slot data.

In some implementations, the fuel dispenser configuration data can characterize one or more configurable aspects of the fuel dispenser, such as fuel dispenser operating parameters, (e.g., a type of fuel to be dispensed, an amount of fuel to be dispensed, a grade of fuel to be dispensed). For example, in some implementations, the fuel dispenser configuration data can characterize the available types/grades/amounts of fuel available at the fuel dispenser. In some implementations, item data characterizing an amount or type of goods/services available at the fueling station store can be received. For example, the item data can characterize a type and/or an amount of consumable items (food, drinks, auto parts, etc.), car care services that are available at the fueling station (e.g., car wash station, etc.) The item data can be received by the client device for further operations as described in detail below.

In some implementations, the location data, the time slot data, and/or the fuel dispenser configuration data, and other types of data described elsewhere herein (e.g., the item data, etc.) can be received by a processor of a client device of the fueling station user. The client device can include, for example, a mobile device of the user of the fuel dispenser, such as a smartphone, a tablet (e.g., iPad), or any other mobile device that includes a display configured to present a graphical interface to the fueling station user. In some implementations, the client device can include a vehicle head unit that is integrated into the user's vehicle and that includes an interactive display configured to present a graphical interface to the fueling station user and to receive one or more inputs from the fueling station user.

At 120, an arrival time of the fueling station user at the fueling station can be determined based on the received location data. In some implementations, the arrival time can characterize a time at which the fueling station user is estimated to arrive at the fueling station. For example, in some implementations, the processor of the client device can use the received location data and data characterizing the location of the fueling station to determine the time required for the fueling station user to travel to the fueling station from their current location, as characterized by the location data, and thereby determine the arrival time. In some implementations, the processor of the client device can receive, from the location sensor, updated location data that characterizes an updated location of the fueling station user relative to the fueling station during the fueling station user's travels. The processor of the client device can then determine, from the received updated location data and from the data characterizing the location of the fueling station, an updated arrival time that characterizes an updated time at which the fueling station user is expected to arrive at the fueling station. In some implementations, to determine the arrival time and/or the updated arrival time, the client device can determine an optimized path of travel for the fueling station user to travel to the fueling station. The optimized path of travel can be determined based on data, received by the processor of the client device, that characterizes traffic patterns along routes between the location of the fueling station user (as characterized by the location data and/or the updated location data) and the location of the fueling station, and such that the time between the current time and the arrival time and/or the updated arrival time is minimized.

At 130, a selection prompt characterizing the received fuel dispenser configuration data can be determined. In some implementations, the selection prompt can be a graphical prompt, for inclusion in the graphical interface presented to the fueling station user via the interactive display of the client device, that characterizes the received fuel dispenser configuration data. For example, the selection prompt can include a listing of one or more operating parameters of the fuel dispenser that are determined from the received fuel dispenser configuration data, such as the types/grades of fuel that are available at the fuel dispenser and the quantity of fuel available at the fuel dispenser. In some implementations, the selection prompt can be determined based on the received item data. As such, the selection prompt can include a listing of goods/services offered at the fueling station, such as an item available for acquisition at the on-site store or an available car wash service that permits the fueling station user to have their vehicle washed at an on-site car wash at the fueling station. In some implementations, the selection prompt can be determined based on the received time slot data and the determined arrival time. For example, the selection prompt can include a listing of the above-described future windows of time during which the fueling station user can occupy the fuel dispenser for obtaining fuel and/or for acquiring the goods/services from the fueling station store, as characterized by the received time slot data, that are close in proximity to the determined arrival time.

In some implementations, the selection prompt can also include at least one field (e.g., a check box, a free-text field, etc.) that is associated with the operating parameter(s) and configured to receive an input from the fueling station user via the fueling station user's interactions with the interactive display of the client device. When presented to the fueling station user via the graphical interface, the user can interact with the display of the graphical device to input values for one or more of the configurable parameters into the fields and thereby select a type of fuel to be dispensed, a grade of fuel to be dispensed, quantity of fuel to be dispensed, and/or one or more goods/services to be acquired while the fuel is being dispensed from the fuel dispenser. By providing the input into the at least one field, the fueling station user can specify the operating parameter(s) of the fuel dispenser (such as those described above) via their client device for the acquisition of fuel, and of other goods/services available at the fueling station, during an upcoming visit to the fuel dispenser and the fueling station by the fueling station user. In some implementations, the selection prompt can also include a field that asks the fueling station user whether they would like to "pay now," and thereby arrange for payment for the fuel/goods/services via their client device, or to "pay later," and thereby arrange for payment when they arrive at the fuel dispenser at a later time. In some implementations, the selection prompt can include, based on the input values, a time estimate that characterizes the estimate amount of required to obtain the amount of fuel desired from the fuel dispenser (and, thereby, characterizes the length of time of the fueling station allocation). In some implementations, when the selection prompt includes the listing of the windows of time characterized by the received time slot data, the listing can be provided as a series of interactive icons, such that the fueling station user, via interacting with the interface, can select the icon corresponding to one of the windows of time and thereby select the window of time at which they would prefer to use the fuel dispenser for fuel dispensing operations.

At 140, selection data characterizing the operating parameter(s) specified during the user's interaction with the selection prompt can be determined in response to the fueling station user's input into the at least one field. For example, in some implementations, the processor of the client device can receive, from the interactive display of the client device, data characterizing the fueling station user's input into the at least one field, and the processor of the client device can determine the selection data based on that received data. The selection data can also be determined based on the received fuel dispenser configuration data and/or the received item data. As such, the selection data can characterize the user's selections of the operating parameters of the fuel dispenser during an upcoming visit to the fuel dispenser by the fueling station user. In some implementations, when the selection prompt includes the listing of the windows of time characterized by the received time slot data, the selection data can include data that characterizes the window of time selected by the fueling station user.

At 150, a fueling station allocation for the fueling station user at the fueling station can be determined based on the determined arrival time, the received time slot data, and the received selection data. The fueling station allocation can characterize a slot of time during which the fuel dispenser is allocated to the fueling station user for the dispensing of fuel from the fuel dispenser that is desired by the fuel dispenser. The length of the slot of time characterized by the fueling station allocation can be based on one or more fuel dispenser operating parameters that are characterized by the selection data, such as the amount of fuel to be dispensed to the fueling station user from the fuel dispenser. In some implementations, the length of the slot of time characterized by the fueling station allocation can be based on the amount of goods/services selected for acquisition by the fueling station user. For example, to determine the slot of time characterized by the fueling station allocation, a database of acquisition times for the dispensing of fuel and/or the acquisition of goods/services can be accessed. The operating parameter(s) characterized by the selection data can be used in determine the appropriate acquisition time in the database to use in determining the slot of time characterized by the fueling station allocation, such that the slot of time by the fueling station allocation can provide the fueling station user with a sufficient amount of time needed to acquire their desired amount of fuel from the fuel dispenser and/or their desired goods/services from the fueling station. In some implementations, when the selection data includes data that characterizes the window of time selected by the fueling station user as described above, the fueling station allocation can be determined such that it aligns or substantially aligns with the selected window of time.

As discussed above, the fueling station allocation can be determined based on the received time slot data. In some implementations, the windows of time of availability of the fuel dispenser, characterized by the received time slot data, can be compared to the slot of time required for acquisition of the desired amount of fuel from the fuel dispenser and/or the desired goods/services from the fueling station, as described above. For example, if the length of the slot of time for acquisition is less than or equal one or more of the windows of time of availability characterized by the received time slot, the fueling station allocation can be determined for the fueling station user's interaction with the fuel dispenser.

As discussed above, the fueling station allocation can be determined based on the determined arrival time. For example, using the determined arrival time, the processor of the client device can determine whether the start time of any of the windows of time of availability of the fuel dispenser characterized by the received time slot data coincides with the determined arrival time. If the start time coincides with the determined arrival time, and the length of the slot of time for acquisition of the fuel, goods, and/or services is less than or equal one or more of the windows of time of availability characterized by the received time slot, the fueling station allocation can be determined for the fueling station user's interaction with the fuel dispenser.

In some implementations, an interactive graphical prompt, which may be a dialog box, that characterizes the fueling station allocation can be determined and presented to the fueling station user via the graphical interface. By interacting with the graphical interface, the fueling station user can select the interactive graphical prompt and thereby reserve the fuel dispenser for the period of time characterized by the fueling station allocation. In response to receiving the user's selection of the interactive graphical prompt, the graphical interface can provide selection data characterizing the user's selection to the processor of the client device, which can provide the fueling station allocation as described in further detail below.

In some implementations, in response to receiving the above-described selection data, a fueling station layout map can be determined. The fueling station layout map can be a graphical depiction that characterizes the location of one or more components/portions of the fueling station (e.g., one or more fuel dispensers at the fueling station, the fueling station convenience store, the car wash, etc.) in relation to one another. The fueling station layout map can be provided to the graphical interface for viewing by the fueling station user. In some implementations, the fueling station layout can include a graphical icon associated with the fuel dispenser that is associated with the selected fueling station allocation. As such, the graphical icon can graphically indicate to the fueling station user which of the fuel dispensers at the fueling station is reserved for the fueling station user during the fueling station allocation.

In some implementations, the fueling station allocation can be modified in the event that the fueling station user is unable to arrive at the fueling station to use the fuel dispenser during the fueling station allocation window. For example, in some implementations, wherein an updated arrival time is determined as described above, the processor of the client device can determine whether the quantity of fuel to be dispensed by the fuel dispenser during the fueling station allocation can actually be dispensed within the slot of time of the fueling station allocation. In the event that the processor determines that the quantity of fuel cannot be dispensed by the fuel dispenser within the slot of time of the fueling station allocation, the fueling station allocation can be disassociated from the fueling station user, such that the fuel dispenser is no longer reserved for the fueling station user when they arrive at the fueling station and is available for reservation by other fueling station users that are en route to the fueling station and/or for use by other fueling station users that are at the fueling station.

In addition, in some implementations, in the event that the fueling station user is unable to arrive at the fueling station to use the fuel dispenser during the fueling station allocation window, if the fuel dispenser is available during the window of time of acquisition, the start of which aligns with the updated arrival time, the fueling station allocation can correspondingly be updated such that the start of the slot of time for the fueling station allocation aligns with the updated arrival time. In some implementations, if the fuel dispenser is unavailable at the updated arrival time, the fueling station allocation can be transferred to another fuel dispenser that is available at the updated arrival time. In some implementations, the fueling station allocation can be updated/disassociated in real time based on location data for the client device that is updated in real time.

As referenced above, item data characterizing a good or service to be acquired by the fueling station user can be received, and the fueling station allocation can be determined based on the user's selection of items characterized by the item data. For example, if the item data characterizes a variety of goods/services that are available at the fueling station, and the user selects, by interacting with the selection prompt, several of the goods/services, the fueling station allocation can be extended to allow the user to acquire all of the selected goods/services within the duration of the fueling station allocation.

At 160, the fueling station allocation data can be provided. For example, in some implementations, the fueling station allocation data can be provided to the fueling station via a remote processor (e.g., cloud, etc.), which can provide the fueling station allocation data to an on-site controller located at the fueling station. The on-site controller can provide the fueling station allocation data to a forecourt controller that is configured to manage the dispensing of fuel to the fuel dispensers located at the fueling station. The forecourt controller can, in turn, provide the fueling station allocation data to the fuel dispenser to be reserved during the fueling station allocation.

In response to receiving the fueling station allocation data, the fuel dispenser can lock the fuel dispenser at the start time of the fueling station allocation such that it can only be activated by the fueling station user during the fueling station allocation. When locked, a processor of the fuel dispenser can determine a code prompt, for depiction on a display of the fuel dispenser, that asks for the input of a unique identifier code that characterizes the fueling station allocation. The unique identifier code, which can be a numeric or alphanumeric code, can be determined when the fueling station allocation is determined, and the unique identifier code can be provided with the fueling station allocation data to the fuel dispenser. In addition, the unique identifier code can be graphical depicted on the graphical interface of the client device such that the code is provided to the fueling station user for their arrival at the fuel dispenser. To unlock the fuel dispenser, the fueling station user can enter the unique identifier code at the fuel dispenser via an input device of the fuel dispenser (e.g., keypad or touchscreen). The fuel dispenser processor can determine whether the unique identifier code provided by the user matches the unique identifier code received with the fueling station allocation. If the unique identifier code provided by the user matches the unique identifier code received with the fueling station allocation, the fuel dispenser can be unlocked for fuel dispensing operations, and the fuel dispenser can perform operations that cause the fuel dispenser to be configured for fuel dispensing in accordance with the fuel dispenser configuration data.

In some implementations, in response to determining that the unique identifier code provided by the user matches the unique identifier code received with the fueling station allocation, a fueling summary prompt can be determined. The fueling summary prompt can characterize the fueling station allocation and/or the parameters of the fuel dispensing operations during the fueling station allocation as represented by the fueling station configuration data. In some implementations, the fueling station summary prompt can characterize an availability status of a good/service specified by the user for acquisition of the good/service at the fueling station.

In some implementations, the fueling station user's payment information can be stored by the client device in an electronic wallet, and payment data characterizing the payment information can be determined and provided by the client device. For example, in some implementations, when the fueling station user has indicated that they wish to "pay now," the payment data can be provided by the client device and to the remote processor in response to the receipt of the selection data, and the fuel dispenser configuration and/or item data can also be provided to the remote processor. The remote processor can provide the payment data, the fuel dispenser configuration data, and the item data to a payment server that is configured to interact with payment-issuing and merchant banks and thereby manage payment, to a merchant bank affiliated with the fueling station, for the fuel, goods, and/or services desired for purchase and characterized by the fuel dispenser configuration data and/or the item data. The payment server can determine, based on the payment data, whether the acquisition of the fuel, goods, and/or services should be authorized. In response to determining that the acquisition should be authorized, the payment server can determine data characterizing an authorization for acquiring the fuel, goods, and/or services and provide the authorization data to the remote processor.

In some implementations, the authorization data, the fuel dispenser configuration data, and the item data can be provided to an on-site store controller located at the fueling station. In some implementations, in response to receiving the authorization data and the item data, the on-site store controller can determine an items instructions prompt, for depiction on a graphical display in operable communication with the on-site store controller, that characterizes an instruction to a fueling station attendant to procure the goods/services characterized by the item data from the fueling station and to make them readily available to the fueling station user during the fueling station allocation. In some implementations, the on-site store controller can receive the unique identifier code, and the items instructions prompt can characterize the unique identifier code. In addition, in some implementations, in response to receiving the authorization data and the fuel dispenser configuration the on-site store controller can provide the received fuel dispenser configuration data to a forecourt controller at the fueling station that is configured to manage the dispensing of fuel to the fuel dispensers located at the fueling station. The forecourt controller can cause the fuel dispenser to be configured in accordance with the fuel dispenser configuration data.

In some implementations, when the fueling station user has selected that they wish to "pay later," the fueling station user can provide their payment information to the fuel dispenser upon entry of the above-described unique identifier code (e.g., by inserting their payment card into a payment card slot at the fuel dispenser, etc.). The fuel dispenser can provide payment data characterizing the received payment information, along with data characterizing the transaction, to the forecourt controller. The forecourt controller can transmit the payment data and the transaction data to the on-site store controller. The fueling station user can provide their payment information to a terminal in operable communication with the on-site store controller and thereby acquire the goods/services at the on-site store. The on-site store controller can provide the payment data the fuel dispenser transaction data, and the on-site store transaction data to the payment server that is configured to interact with payment-issuing and merchant banks and thereby facilitate payment, to a merchant bank affiliated with the fueling station, for the fuel, goods, and/or services purchased during the fueling station allocation.

In some implementations, when all of the fuel/goods/services have been acquired by the fueling station user during the fueling station allocation, data characterizing the acquisition of the fuel, goods, and/or services and the payment data can be provided to the remote processor. In some implementations, the acquisition data can include a date of the acquisition, a time of the acquisition, a fueling station unique identifier, a type of the fuel acquired by the fueling station user, a grade of the fuel acquired by the fueling station user, an amount of the fuel acquired by the fueling station user, a cost of the amount of the fuel acquitted by the fueling station user, a fuel dispenser pump unique identifier, and/or a fuel dispenser hose unique identifier. The remote processor can, based on the received payment data and the received acquisition data, finalize the acquisition and thereby facilitate the fueling station user's payment for the acquired fuel, goods, and/or services to the merchant bank affiliated with the fueling station.

Some of the operations described above are described with respect to fuel dispensing systems and with respect to acquisition of fuel from the fuel dispenser. However, in some implementations, one or more of operations described herein can also be used in conjunction with electricity dispensing systems, and, as such, can also be applicable to the acquisition of electricity from a vehicle charging station located at the fueling station. In addition, the operations described herein can also be applicable to the acquisition of any other products available at the fueling station for which the user must occupy a dispensing station for a period of time (e.g., diesel exhaust fluid dispensers/dispensing systems, air compressor/air compression systems, etc.).

Figure 2:
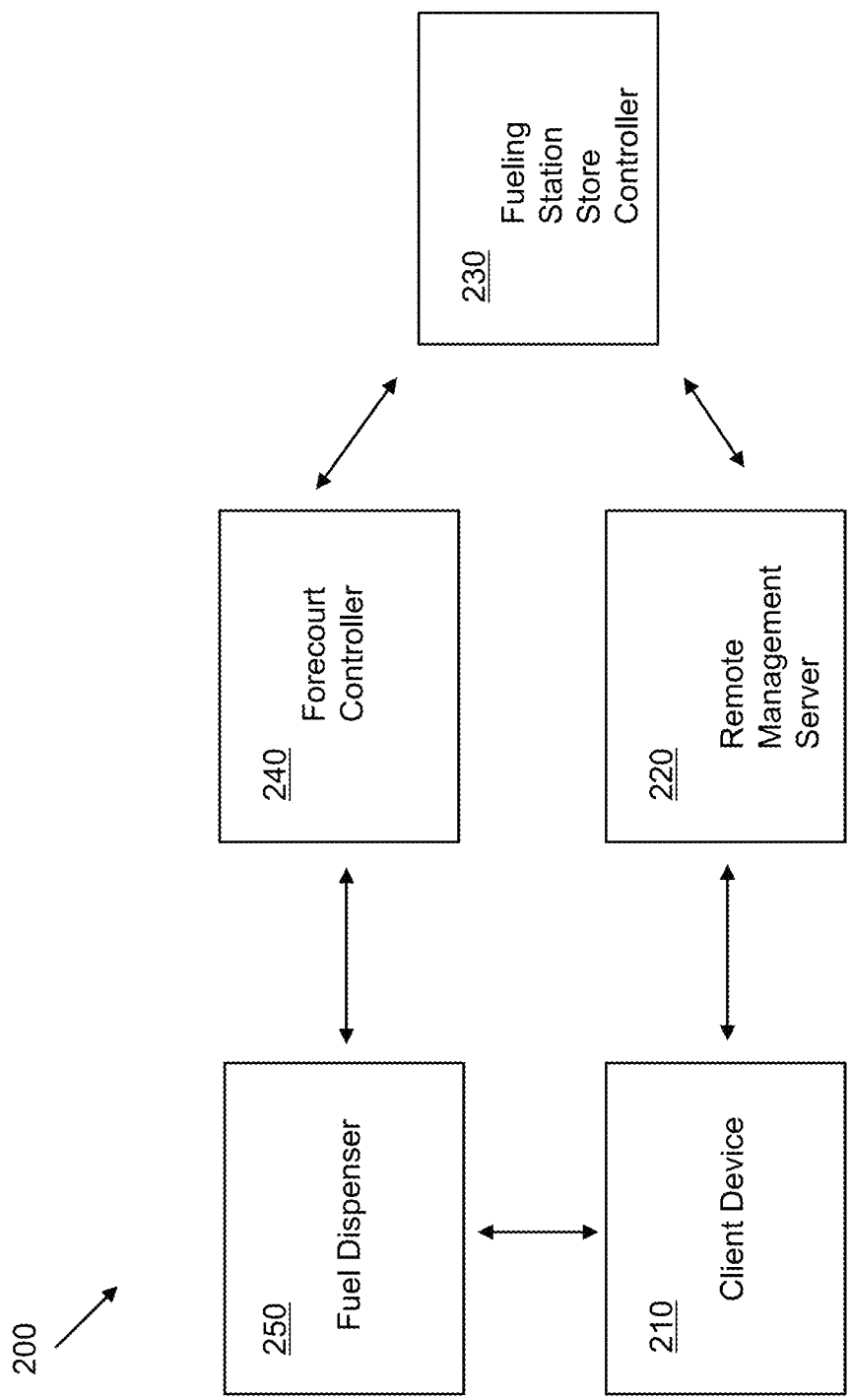
FIG. 2 is a schematic view illustrating components of an example system that can provide for slot-based allocation for fueling at a fueling station.

In some implementations, the current subject matter can be implemented in a system 200, as shown in FIG. 2. As shown, the system 200 can include one or more of a client device 210, a remote management server 220, an on-site store controller 230, a forecourt controller 240, and a fuel dispenser 250.

In some implementations, the client device 210 can be in operable communication with the remote management server 220 and can include at least one data processor, memory, and an input/output device, and can be configured to perform one or more aspects of the client device functionality described herein. The client device 210 can also include an application 211 that is configured to operate on the device and thereby provide the location data, the time slot data, the fuel dispenser configuration data, and other data types as shown and described herein to a graphical interface (GUI) 212 of the client device, and to receive user inputs for selecting fuel dispenser operation parameters, goods/services that are available at the fueling station, a time slot of availability of a fuel dispenser (e.g., fuel dispenser 250) at the fueling station, that are made by the user via the graphical interface (GUI) 212. The graphical interface 212 can be displayed on a display 223 of the client device 220.

In some implementations, the remote management server 220 can be in operable communication with the client device 210 and the fueling station store controller 230 and can include one or more servers configured to perform one or more aspects of the server and database functionality described herein. For example, the remote management server 220 can be configured to receive, from the fueling station store controller 230, the time slot data, the fuel dispenser configuration data, The remote management server 220 can be in operable communication with one or more payment servers that are configured to manage payment of the transaction.

Although these servers and databases are shown as separate components within the remote management service 220, the functionalities performed by these separate servers and databases can be performed by a single server or database, or by any combination of servers and/or databases as required to ensure compatibility with existing/legacy components at fueling points/fueling stations, to maintain operational capacity in the event of service outages, and to improve the reliability of the systems and components described herein.

In addition, as mentioned above, in some implementations the system 200 can include a fueling station store controller 230 that is located at a fueling station store that is or near the fueling station at which the fuel dispenser 210 is located. The on-site store at which the fueling station store controller 230 is located can include products and/or services that are offered for sale by the fueling station in addition to fuel, such as convenience store items, restaurant service, and car wash services. The fueling station store controller 230 can be incorporated into a point-of sale ("POS") device that is operated by a fueling station attendant, and the fueling station store controller 230 configured to manage payment for the items in the on-site store and to facilitate the dispensing of fuel from the fuel dispenser 210 in accordance with the functionality described herein.

In some implementations, the forecourt controller 240 can include at least one data processor configured to facilitate the management of the fuel dispenser 250 in accordance with the functionality described herein.

In some implementations, the fuel dispenser 250 can be configured to dispense fuel and can include at least one data processor, memory, and an input/output device, and each can be configured to perform one or more aspects of the fuel dispenser functionality described herein. As shown and described herein, the fuel dispenser 210 can include components and programming that enable the fuel dispenser to provide fuel to a user and to facilitate payment for the fuel dispensed. In some implementations, the fuel dispenser can include components and programming that enable the fuel dispenser to provide the fuel, and the fuel dispenser can operate in conjunction with a payment terminal that includes components and programming configured to perform the payment and transaction functionalities described herein.

FIGS. 3A-3F illustrate a series of illustrations of the graphical user interface portrayed on the interactive display of the client device 210 in accordance with some implementations of the subject matter.

Figure 3A:
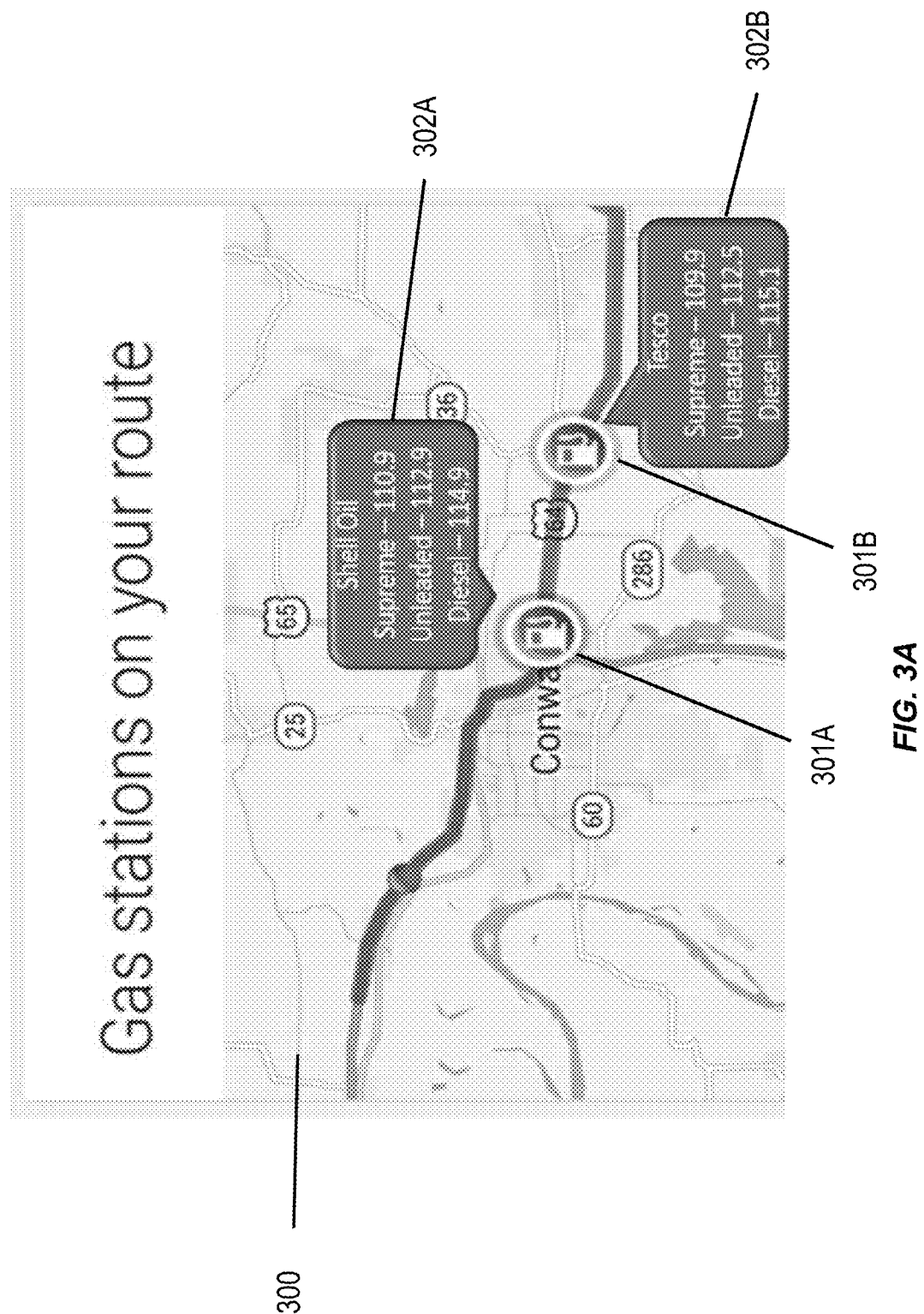
FIG. 3A is an illustration of one embodiment of a graphical interface that can be presented to the fueling station user via an interactive display of the client device when the user begins to reserve a fuel dispenser at a fueling station.

FIG. 3A illustrates the graphical interface presented to the fueling station user via the interactive display of the client device when the user begins to reserve a fuel dispenser at a fueling station. As shown, the graphical interface includes a map 300 that incorporates icons, such as icons 301A, 301B, that depict on the map 300 the location of fueling stations in the vicinity of the client device. In addition, the graphical interface can include detail prompts 302A, 302B that is affiliated with each icon 301A, 301B and that display the name of each fueling station shown on the map 300. As shown in FIG. 3A, in some implementations, the detail prompts 302A, 302B can also display the grades of fuel available at each fueling station as well as the unit price (e.g., price per gallon, etc.) of each grade of fuel. The fueling station user can, by interacting with the interactive display of the client device, select the fueling station from which they wish to obtain fuel/goods/services by touching the display in the area of the detail prompt corresponding to the fueling station of interest. The graphical interface then can be modified to display information pertaining to that fueling station as described in further detail below.

Figure 3B:
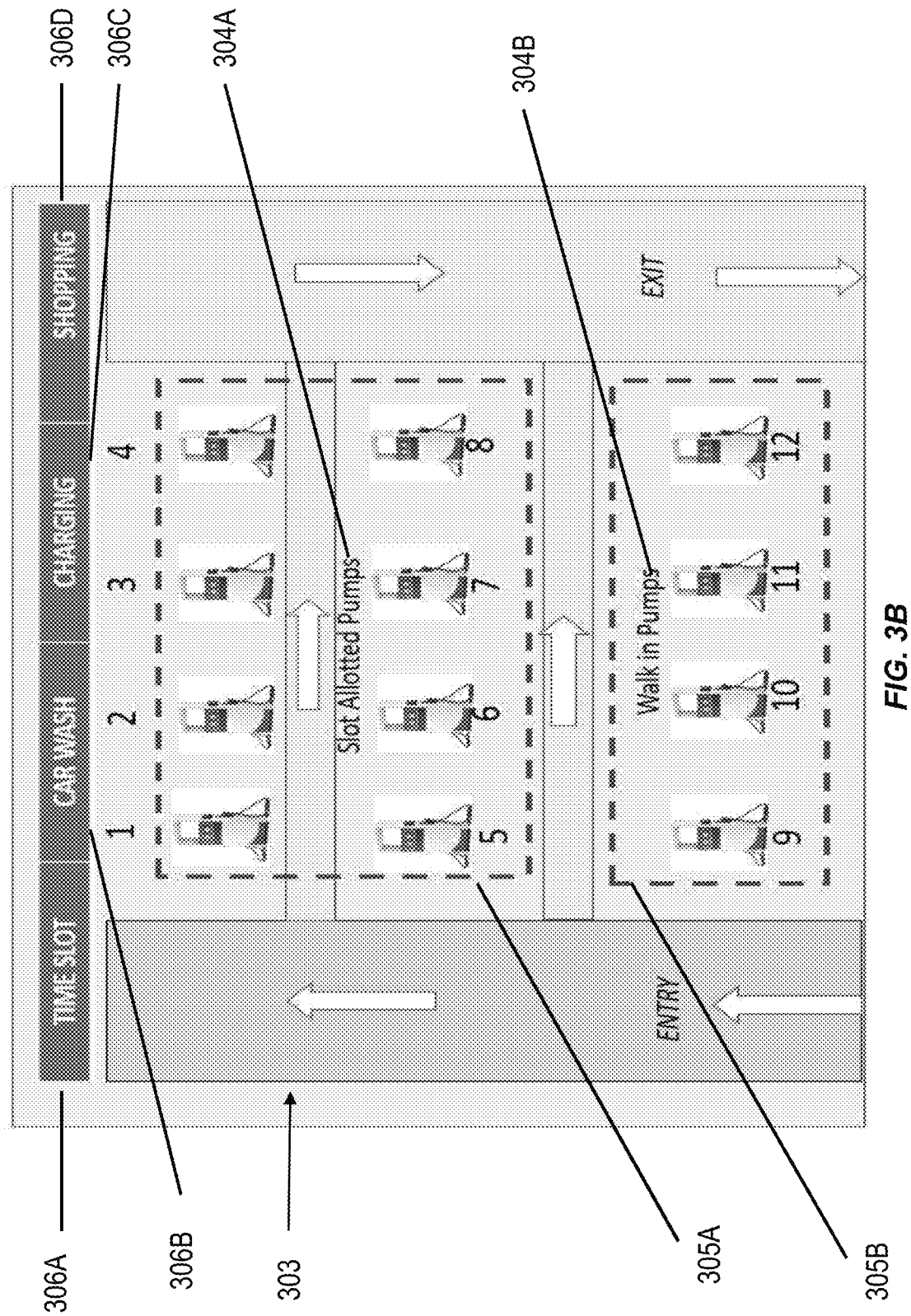
FIG. 3B is an illustration of the graphical interface of FIG. 3A that can be presented to the fueling station user via an interactive display of the client device once the user has selected a fueling station.

FIG. 3B illustrates the graphical interface presented to the fueling station user once the user has selected the fueling station as described above with respect to FIG. 3A. As shown, the graphical interface includes a layout diagram 303 that illustrates the layout of the selected fueling station. As shown, the layout diagram 303 includes graphical representations of each fuel dispenser 1-12 located at the fueling station and graphical elements (e.g., text 304A, 304B, boxes 305A, 305B, etc.) that indicate which of the fuel dispensers located at the fueling station are designated as "slot allotted pumps" that are available for reserving in advance and which of the fuel dispensers at the fueling station are designed as "walk in pumps" that are not available for reserving. As shown, the graphical interface also includes several drop-down menu buttons, such as a time slot drop-down menu button 306A, a car wash drop-down menu button 306B, a charging drop-down menu button 306C, a shopping drop-down menu button 306D. The fueling station user can select, by interacting with the interactive display of the client device, one or more of drop-down menu buttons 306A-306D, which causes the graphical interface to present additional options, such as those explained in further detail below.

Figure 3C:
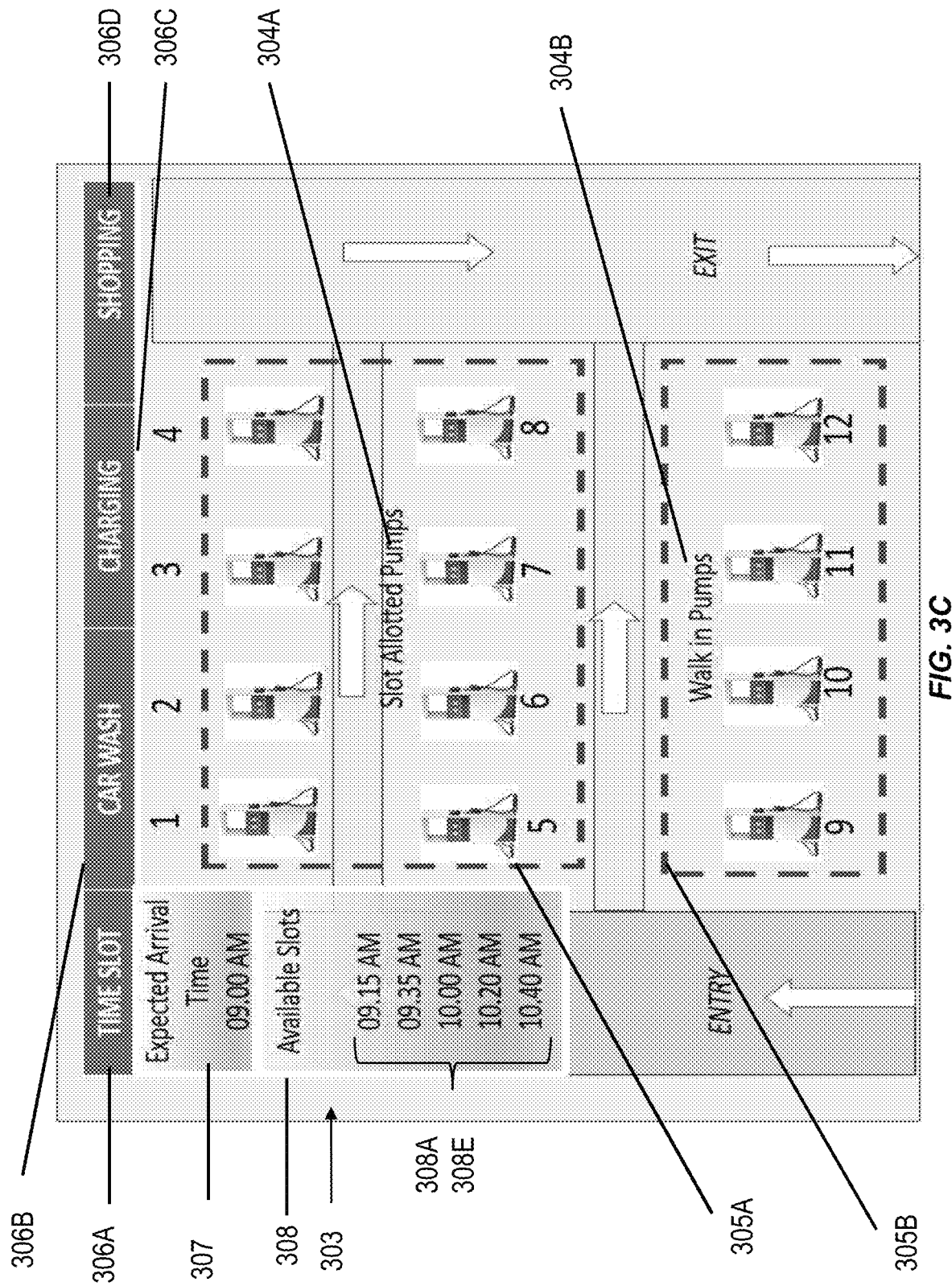
FIG. 3C is an illustration of the graphical interface of FIG. 3A that can be presented to the fueling station user via an interactive display of the client device once the user has selected a time slot drop-down menu button.

FIG. 3C illustrates the graphical interface presented to the fueling station user once the user has selected the time slot drop-down menu button 306A. As shown, once the time slot drop-down menu button 306A has been selected, an expected arrival time graphic 307 and an available slot selection prompt 308 is displayed. As shown, the expected arrival time graphic 307 displays the determined arrival time of the fueling station user at the fueling station. The available slots selection prompt 308 displays one or more time slots 308A-308E at which one or more of the "slot allotted" fuel dispensers is available for fuel dispensing operations. The fueling station user can select, by interacting with the interactive display of the client device, select one of the time slots 308A-308E listed in the available slots selection prompt 308.

Figure 3D:
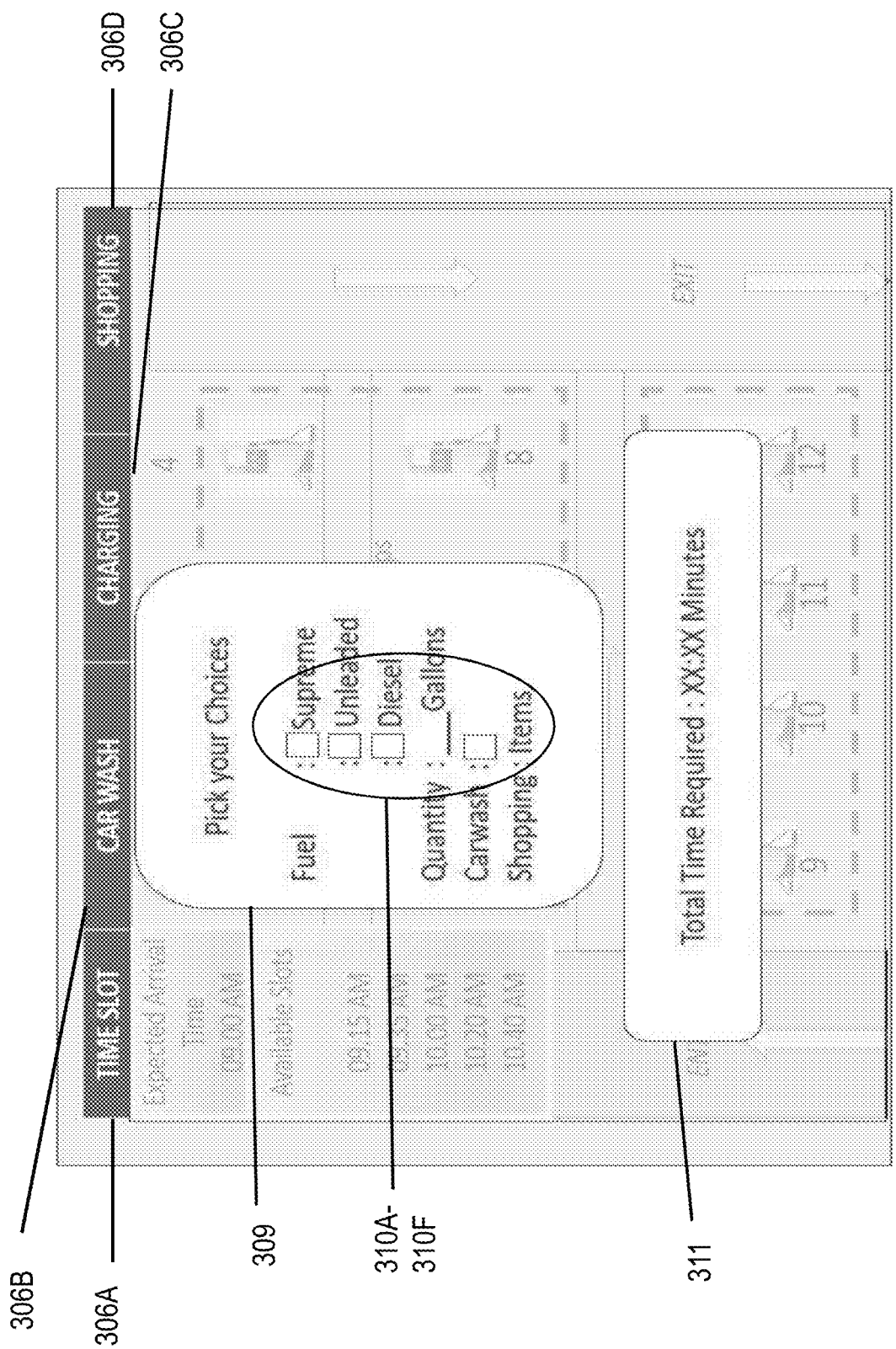
FIG. 3D is an illustration of the graphical interface of FIG. 3A that can be presented to the fueling station user via an interactive display of the client device once the user has selected a time slot depicted in a time slot drop-down menu.

FIG. 3D illustrates the graphical interface presented to the fueling station user once the user has selected one of the time slots 308A-308E. As shown, once the user has selected the time slot, the graphical interface includes a selection prompt 309 that allows the fueling station user to select the type/grade and amount of fuel to be dispensed from the fuel dispenser, whether they want a car wash, and any items for purchase at the fueling station. To select these parameters, the selection prompt 309 can include one or more fields 310A-310F. The graphical interface can also include a total time prompt 311 that is configured to display an estimated total time required that is determined in real-time based on the selected fuel/goods/services selected by the user. The user can provide inputs to the one or more fields 310A-310F, and thereby select the operating parameters of the fuel dispenser during the reservation of the fuel dispenser and/or goods/services for acquisition at the fueling station. Once these inputs have been provided, the fueling station allocation can be determined in accordance with the functionality described elsewhere herein.

Figure 3E:
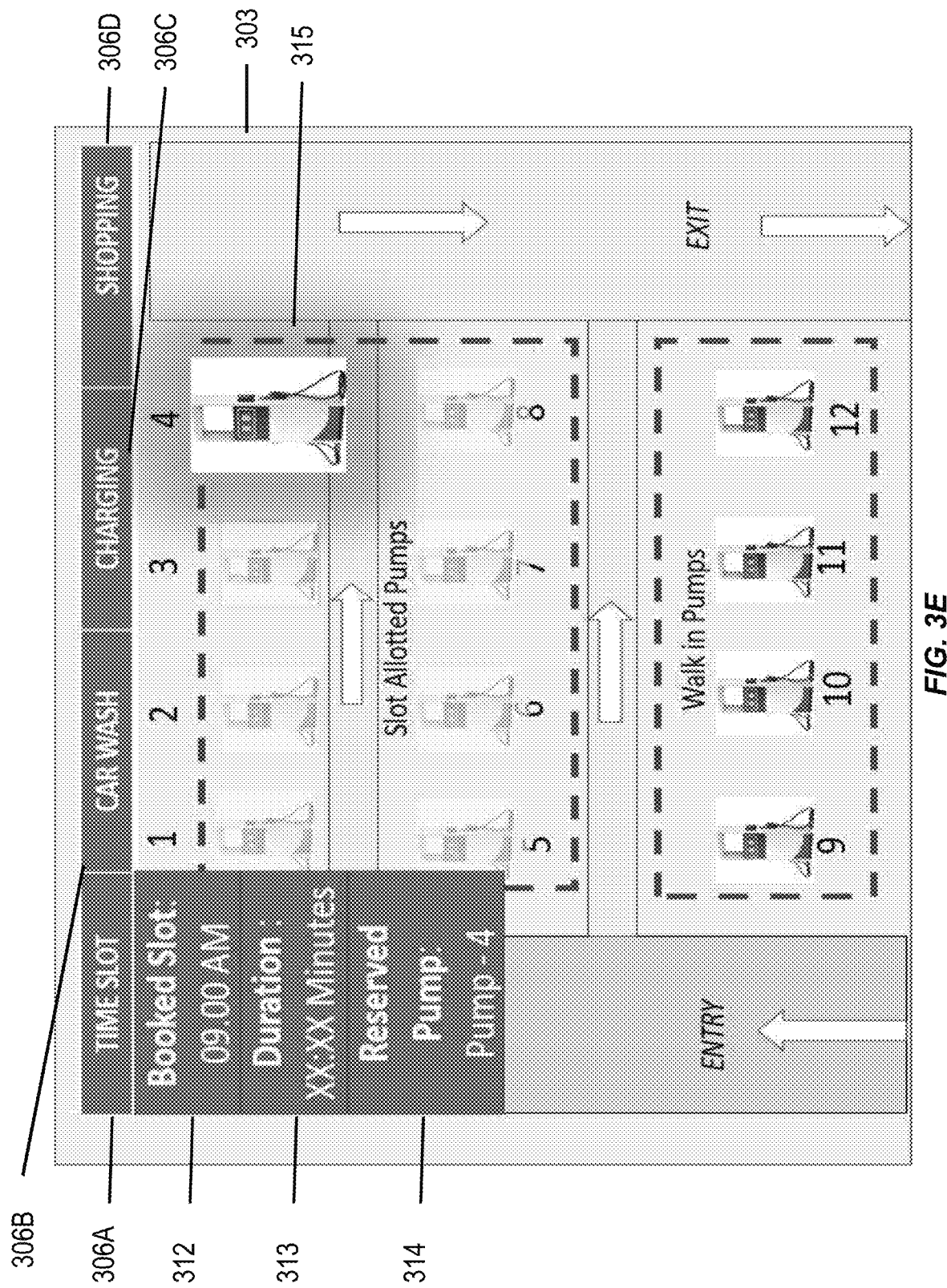
FIG. 3E is an illustration of the graphical interface of FIG. 3A that can be presented to the fueling station user via an interactive display of the client device once the user has made selections via interacting with the graphical interface.

FIG. 3E illustrates the graphical interface presented to the fueling station user once the user has made the selections described above with respect to FIG. 3D. As shown, the interface includes a booked slot window 312 that indicates the start time of the fueling station allocation, a duration window 313 that indicates the duration of the fueling station allocation, and a pump reservation window 314 that indicates the fuel dispenser at the fueling station that has been reserved and that is associated with the fueling station allocation. In addition, in the interface, the reserved fuel dispenser is highlighted with a highlight graphic 315 that is overlaid on the layout diagram 303 to provide a visual aid to the user as to the location of their reserved fuel dispenser at the fueling station.

Figure 3F:
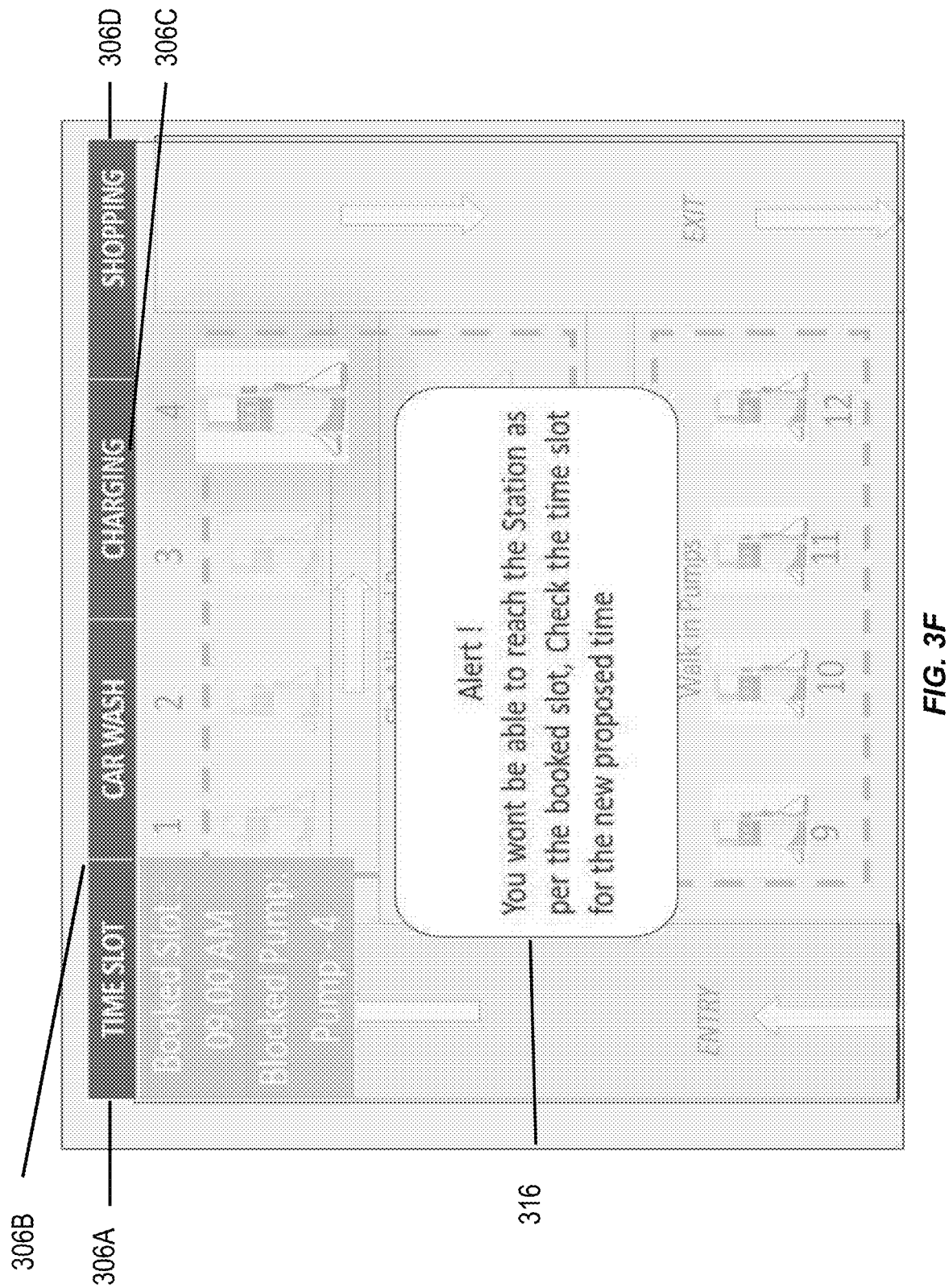
FIG. 3F is an illustration of the graphical interface of FIG. 3A that can be presented to the fueling station user via an interactive display of the client device that the fueling station user cannot reach the fueling station in time for a fueling station allocation.

FIG. 3F illustrates the graphical interface presented to the fueling station user in the event it is determined that the fueling station user cannot reach the fueling station in time for the start of the fueling station allocation. As shown, the interface includes a prompt 316 indicating that the user will be unable to reach the fueling station in time for the start of the fueling station allocation. When this occurs, the application will automatically release the fueling station allocation and recommend an updated time slot for the user to book in accordance with the functionality described elsewhere herein.

Figure 4:
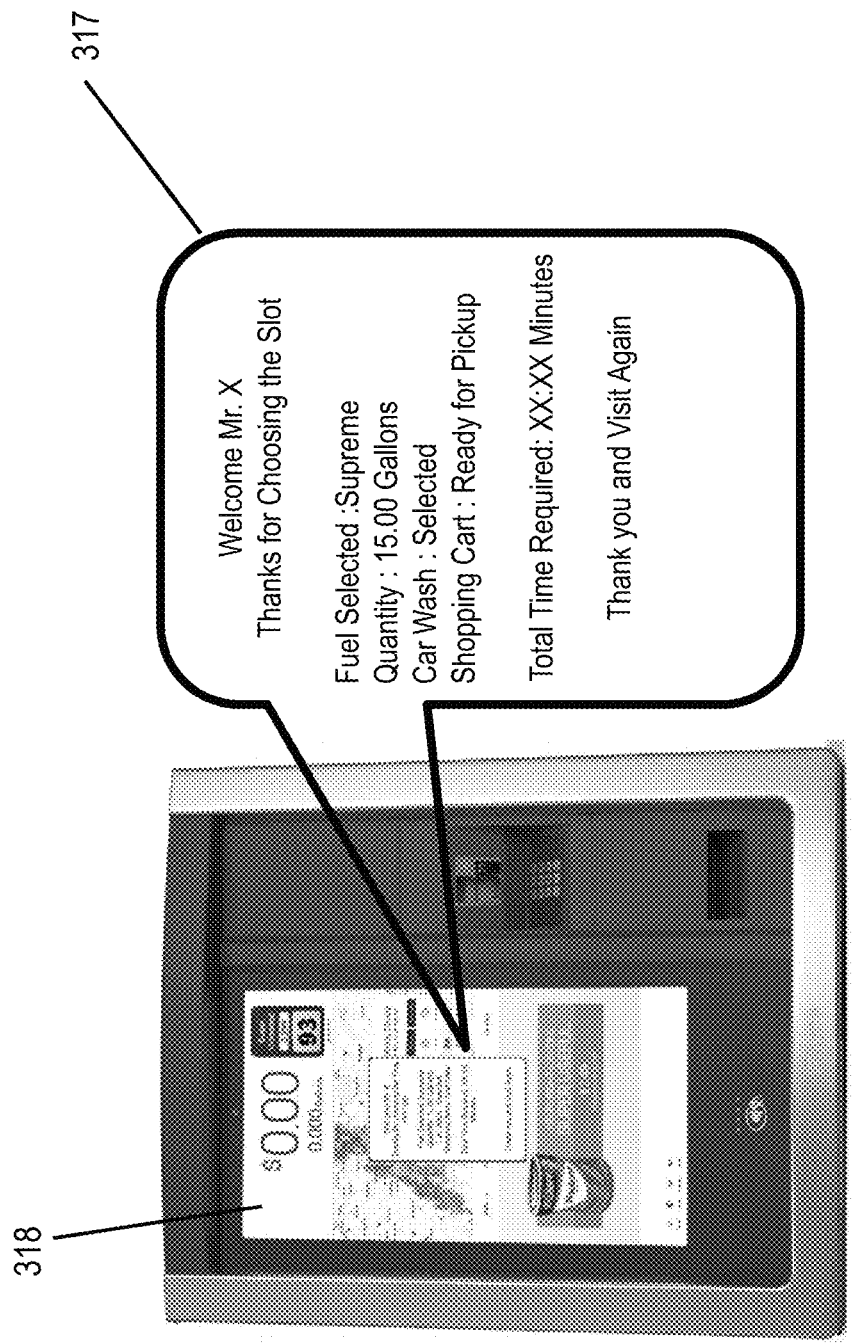
FIG. 4 is an illustration of one embodiment of a prompt that is displayed to the user when they arrive at start of the fueling station allocation.

FIG. 4 illustrates a fueling summary prompt that is displayed to the user on a display 318 of a fuel dispenser when they arrive at the fuel dispenser at the start of the fueling station allocation. As shown, the prompt includes information pertaining to the selected fuel/goods/services that matches those selected by the fueling station user via the graphical interface on the client device prior to the start of the fueling station allocation.

Figure 6:
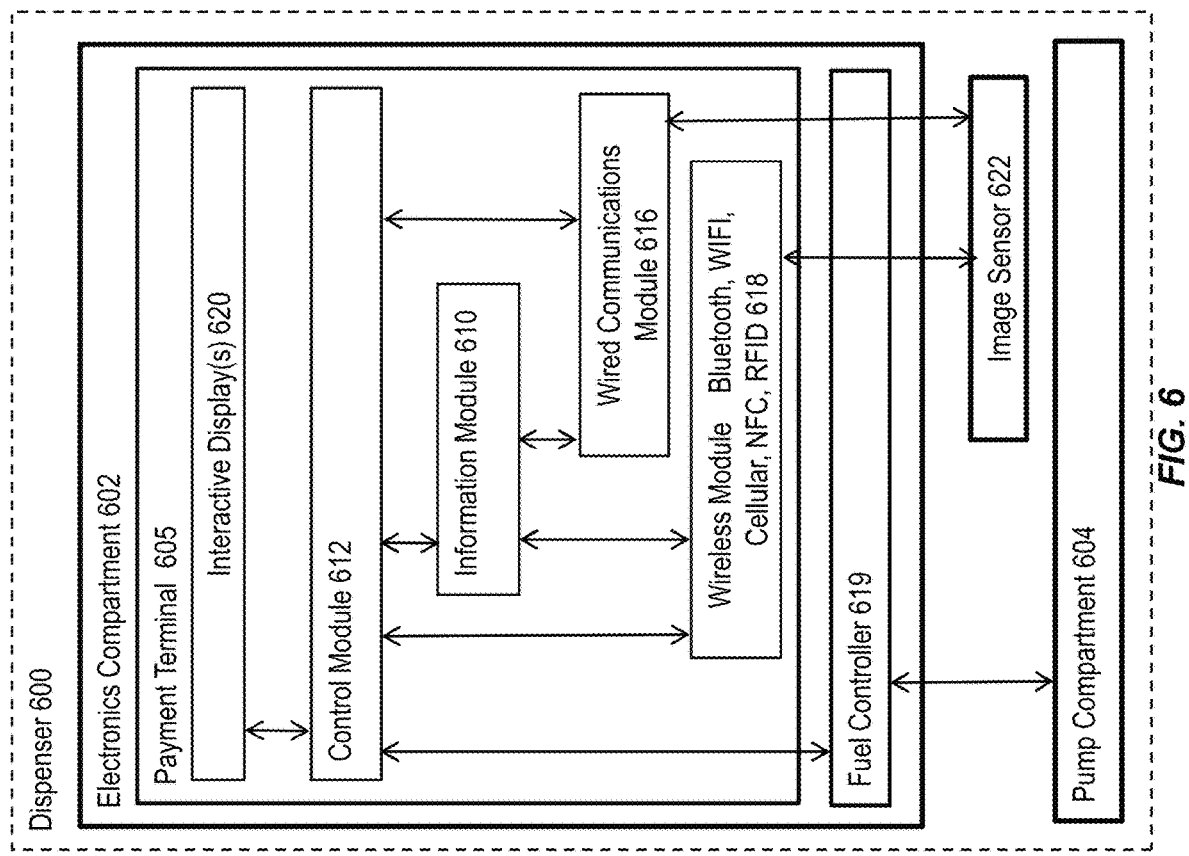
FIG. 6 is a diagram showing internal components of the fuel dispenser of FIGS. 5A and 5B.

FIGS. 5A and 5B illustrate one embodiment of a dispenser 500 that is configured to dispense fuel and that that can be used in some implementations of the current subject matter, and FIG. 6 illustrates components of the dispenser. In general, the dispenser 500 includes a dispenser body 501 having an electronics compartment 502, a pump compartment 504, and an image sensor 522. The pump compartment 504 houses a pump configured to pump fuel from a fuel tank or other reservoir, as well as one or more meters that can be configured to monitor fuel flow, flow of fuel additives, and/or flow of other components of the fuel. The pump compartment 504 can also include other components to facilitate fuel dispensing and mixing, such as motors and valves, a strainer/filtering system, a vapor recovery system, and the like. The pump compartment 504 is isolated from the electronics compartment 502 within the dispenser 500 to facilitate safety, security, and/or maintenance, as will be appreciated by a person skilled in the art. Fuel is thus not allowed to flow from the pump compartment 504 to the electronics compartment 502 and instead flows from the pump compartment 504 through hose 506 to a nozzle 508 for dispensing. As will be appreciated by a person skilled in the art, the nozzles 508 are each configured to dispense fuel from the dispenser 500 as pumped therefrom by the pump. The dispenser 500 also includes a nozzle receptacle 509 configured to store the nozzle 508 when not in use.

In some implementations, the dispenser 500 can be configured to dispense electricity and can include several components for dispensing the electricity. For example, dispenser 500 can include a charging cable 524 coupled to the dispenser body 501 at one end and configured to deliver electricity to a charging connector 526 coupled to an opposite end. The charging connector 526 can be configured to couple to a charging port of a vehicle (not shown) and to deliver the electricity provided by the dispenser 500, via the charging cable 524, to the vehicle when coupled to the charging port. When not in use, the charging connector 526 can be stored in a charger receptacle 528 formed on the dispenser body 501.

The electronics compartment 502 houses electronics for facilitating payment for fuel and for facilitating the dispensing of the fuel. For example, the electronics compartment 502 can include a fuel controller 519 that, at least in some implementations, includes a data processor, memory, and storage forming part of at least one computing system. The fuel controller 519 is configured to control dispensing of the fuel from the pump compartment 504. The electronics compartment 502 also includes a payment terminal 505 that is configured to provide a user with one or more options to create a desired fuel mixture, receive instructions characterizing the desired fuel mixture, receive payment information and/or user identification information from a user, transmit and receive the payment information and/or the user identification information with a POS system via a forecourt controller (not shown), and deliver fueling instructions to the fuel controller 519 to dispense fuel. The payment terminal 505 can also be configured to provide a user with information related to a status of fueling. For example, the payment terminal can display an amount of fuel that has been dispensed, and a corresponding fuel cost as the fuel mixture is dispensed.

The payment terminal 505 can be configured to facilitate communication between a user and the fuel controller 519, and can include an interactive display 520 and an information module 510. The information module 610 can, at least in some implementations include a data processor, memory, and storage, forming part of at least one computing system. The payment terminal 505 can also include one or more wired communication modules 516 and/or wireless communication modules 518 and a control module 512 that, at least in some implementations includes a data processor, memory, and storage, forming part of at least one computing system. The communication modules 516, 518 can function to allow data to be transmitted to and from various components within the payment terminal 505 via wired and/or wireless communication, respectively. For example, the communication modules 516, 518 can be configured to transmit and receive signals that can characterize, e.g., payment information, user identification information, and/or information regarding a desired fuel selection, via wired and/or wireless communications, respectively. The wireless communication module 518 can include, e.g., a transceiver for communicating via Bluetooth protocol, cellular protocol, WI-FI protocol, near field communication (NFC), and/or a radio frequency identification (RFID) protocol. Wired and/or wireless communication via the communication modules 516, 518 can be according to any of a variety of communication protocols, e.g., TCP/IP, etc., as will be appreciated by a person skilled in the art. The communication modules 516, 518 are also in operable communication with the image sensor 522 and are configured to receive image data acquired by the image sensor 522. The communication modules 516, 518 can additionally transmit the received image data for further external processing as described elsewhere herein.

The interactive display 520, which can be, or can include, a touchscreen. The interactive display 520 can be operably coupled to the control module 512 which can be used to control, dynamically rearrange, and/or update a graphical user interface (GUI) rendered on the display 520. The display 520 can be configured to show information (e.g., media content, fuel selection options, payment information, user identification information, etc.) in the form of one or more graphical elements, or graphical objects, receive input (e.g., instructions for a desired fuel mixture, user identification information, payment information, etc.) thereon, and can deliver data characterizing the input to the control module 512 to be processed. Some examples of information that the display 520 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a device that will consume the fuel, such as vehicle make, model, mileage, and the like. The user can also be provided with a recommend fuel blend which they can choose to select.

The subject matter described herein can provide several advantages. For example, some implementations of the current subject matter can provide for an improved and more efficient method of operating a fuel dispenser than current techniques provide. For example, with the current subject matter, configuration and management of fuel dispenser operations can be performed using their client device (e.g., mobile device, in-car display, etc.), and one or more portions of the fuel dispenser configuration can be performed by the user prior to their arrival, which results in the increased operational efficiency of the fuel dispenser during the acquisition of fuel from the fuel dispenser. In addition, some implementations of the current subject matter can provide for safer experiences at a fueling station for fueling station users and attendants. And, some implementations of the current subject matter can provide for a centralized platform for accessing multiple forms of data associated with the acquisition of fuel, goods, and/or services (e.g., fuel dispenser configuration data, fuel dispenser operating parameters, acquisition history data, etc.), which can allow for more efficient computational operations that require a reduced number of computational components to achieve the functionality described herein than would otherwise be required.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method comprising:
 receiving data characterizing a location of a fueling station user relative to at least one fueling station, a time slot of availability of at least one fuel dispenser at the at least one fueling station during which the at least one fuel dispenser is available to dispense fuel to the fueling station user, and a configuration of the at least one fuel dispenser for fuel dispensing operations;
 determining a first view of a graphical user interface (GUI), the first view including a map view of a plurality of selectable fueling stations arranged relative to the location of the fueling station user and including the at least one fueling station;
 providing the first view of the GUI on a client device of the fueling station user;
 receiving first selection data characterizing a selection of the at least one fueling station selected via the first view of the GUI;
 determining an arrival time of the fueling station user at the selected at least one fueling station based on the received location data and first selection data, the arrival time characterizing a time at which the fueling station user is estimated to arrive at the selected at least one fueling station;
 determining a second view of the GUI, the second view including a selection of time slots corresponding to the arrival time of the fueling station user at the selected at least one fueling station;
 providing the second view of the GUI on the client device of the fueling station user;
 receiving second selection data characterizing a time slot corresponding to the arrival time of the fueling station user at the selected at least one fueling station, the time slot selected via the second view of the GUI;
 determining a selection prompt that characterizes the received fuel dispenser configuration data, the selection prompt including a field for specifying an operating parameter of the at least one fuel dispenser;
 providing the selection prompt in the second view of the GUI on the client device of the fueling station user;
 receiving third selection data characterizing the operating parameter of the at least one fuel dispenser in response to an input of the operating parameter of the at least one fuel dispenser provided to the field of the selection prompt;
 determining an updated second view of the GUI based on the third selection data, the updated second view including an indication of a confirmed time slot corresponding to the selected time slot, a duration of the confirmed time slot, and an indication of a reserved fuel dispenser, the updated second view of the GUI determined based on the determined arrival time, the selected time slot, and the selected operating parameter;

providing the updated second view of the GUI on the client device of the fueling station user;

locking the reserved fuel dispenser at a start time of the confirmed time slot;

receiving data characterizing an authorization to dispense fuel from the reserved fuel dispenser, the authorization indicating that the fueling station user has arrived at the reserved fuel dispenser; and enabling the reserved fuel dispenser to dispense fuel to the fueling station user based on the received authorization data.

2. The method of claim 1, wherein the selection prompt further comprises additional fields configured to receive an input selecting at least one of a quantity of fuel to be dispensed during the selected time slot, a carwash, and a shopping item.

3. The method of claim 2, wherein the selection prompt further comprises a total time prompt characterizing a duration of time of the selected time slot, the duration of time determined based on the selection of the operating parameter and the selection of at least one of the quantity of fuel to be dispensed during the selected time slot, the carwash, and the shopping item.

4. The method of claim 2, further comprising:
receiving updated location data characterizing an updated location of the fueling station user relative to the selected at least one fueling station;

determining an updated arrival time of the fueling station user at the selected at least one fueling station based on the received updated location data, the updated arrival time characterizing an updated time at which the fueling station user is expected to arrive at the selected at least one fueling station;

determining whether a quantity of fuel to be dispensed by the reserved fuel dispenser can be dispensed within the confirmed time slot; and in response to determining that the quantity of fuel cannot be dispensed by the reserved fuel dispenser within the confirmed time slot, disassociating the reserved fuel dispenser from the fueling station user.

5. The method of claim 4, further comprising:
in response to determining that the quantity of fuel cannot be dispensed by the reserved fuel dispenser within the confirmed time slot, determining an updated selection of time slots based on the determined updated arrival time, the confirmed time slot, and the received fuel dispenser configuration data, the updated selection of time slots including an updated time slot during which the previously reserved fuel dispenser or a second fuel dispenser is available to the fueling station user for the dispensing of fuel therefrom;

determining an updated prompt characterizing the updated time slot; and providing the updated prompt atop the second view of the GUI on the client device.

6. The method of claim 1, further comprising:
receiving item data characterizing a good or service to be acquired by the fueling station user while at the selected at least one fueling station, and wherein the selected at least one fueling station is determined based on the received item data.

7. The method of claim 6, further comprising:
determining an item retrieval prompt based on the received item data, the item retrieval prompt characterizing the good or service to be acquired and configured to be presented on a display of a convenience store terminal located at a convenience store of the selected at least one fueling station; and providing the item retrieval prompt to the display of the convenience store terminal for depiction thereby.

8. The method of claim 1, further comprising:
determining a unique identifier code that characterizes the reserved fuel dispenser;

determining a code prompt that includes the unique identifier code and is configured to be presented on the client device; and providing the code prompt for display on the client device for depiction thereby.

9. The method of claim 8, further comprising:
providing the unique identifier code to the reserved fuel dispenser; and in response to determining that the unique identifier code included in the code prompt matches the unique identifier code provided to the reserved fuel dispenser, causing the reserved fuel dispenser to dispense fuel.

10. The method of claim 9, further comprising:
in response to determining that the unique identifier code included in the code prompt matches the unique identifier code provided to the reserved fuel dispenser, determining a fueling summary prompt configured to be presented on a display of the reserved fuel dispenser, the fueling summary prompt characterizing the fuel dispenser configuration data, the confirmed time slot, and an availability status of a product that is available at the selected at least one fueling station.

11. The method of claim 1, further comprising determining a fuel prompt characterizing at least one fueling station of the plurality of selectable fueling stations and a unit price of a grade of fuel available at the at least one fueling station of the plurality of selectable fueling stations;

determining a fuel prompt map overlay that overlays the determined fuel prompt on the map view of the first view of the GUI; and providing the fuel prompt map overlay on the map view of the first view of the GUI provided on the client device of the fueling station user.

12. The method of claim 1, further comprising configuring the selected at least one fuel dispenser to dispense the fuel based on the received fuel dispenser configuration data.

13. The method of claim 1, wherein the second view of the GUI and the updated second view of the GUI include a map view of the selected at least one fueling station showing a plurality of available fuel dispensers including the at least one fuel dispenser and a plurality of unavailable fuel dispensers.

14. The method of claim 13, wherein the updated second view of the GUI includes an identifier of the reserved fuel dispenser overlaid atop the plurality of available fuel dispensers displayed within the map view of the selected at least one fueling station, the identifier characterizing a location of the selected at least one fuel dispenser within the plurality of available fuel dispensers.

15. The method of claim 13, wherein the map view of the selected at least one fueling station showing the plurality of available fuel dispensers and the plurality of unavailable fuel dispensers illustrates a navigable path through the plurality of available fuel dispensers and the plurality of unavailable fuel dispensers to an exit of the selected at least one fueling station.

16. The method of claim 1, wherein the second view of the GUI and the updated second view of the GUI includes at least one graphical element configured to select at least one of the time slots corresponding to the arrival time of the fueling station user, a car wash, a vehicle charger, or a shopping item.

17. A system comprising:
a client device including an interactive display;
at least one data processor communicably coupled to the client device; and
memory storing instructions configured to cause the at least one data processor to perform operations comprising:
receiving data characterizing a location of a fueling station user relative to at least one fueling station, a time slot of availability of at least one fuel dispenser at the at least one fueling station during which the at least one fuel dispenser is available to dispense fuel to the fueling station user, and a configuration of the at least one fuel dispenser for fuel dispensing operations;
determining a first view of a graphical user interface (GUI), the first view including a map view of a plurality of selectable fueling stations arranged relative to the location of the fueling station user and including the at least one fueling station;
providing the first view of the GUI on the interactive display of the client device;
receiving first selection data characterizing a selection of the at least one fueling station selected via the first view of the GUI;
determining an arrival time of the fueling station user at the selected at least one fueling station based on the received location data, the arrival time characterizing a time at which the fueling station user is estimated to arrive at the selected at least one fueling station;
determining a second view of the GUI, the second view including a selection of time slots corresponding to the arrival time of the fueling station user at the selected at least one fueling station;
providing the second view of the GUI on the interactive display of the client device;
receiving second selection data characterizing a time slot corresponding to the arrival time of the fueling station user at the selected at least one fueling station, the time slot selected via the second view of the GUI;
determining a selection prompt that characterizes the received fuel dispenser configuration data, the selection prompt including a field for specifying an operating parameter of the at least one fuel dispenser;
providing the selection prompt in the second view of the GUI on the interactive display of the client device;
receiving third selection data characterizing the operating parameter of the at least one fuel dispenser in response to an input of the operating parameter of the at least one fuel dispenser provided to the field of the selection prompt;
determining an updated second view of the GUI based on the third selection data, the updated second view including an indication of a confirmed time slot corresponding to the selected time slot, a duration of the confirmed time slot, and an indication of a reserved fuel dispenser, the updated second view of the GUI determined based on the determined arrival time, the selected time slot, and the selected operating parameter;
providing the updated second view of the GUI on the interactive display of the client device;
locking the reserved fuel dispenser at a start time of the confirmed time slot;
receiving data characterizing an authorization to dispense fuel from the reserved fuel dispenser, the authorization indicating that the fueling station user has arrived at the reserved fuel dispenser; and
enabling the reserved fuel dispenser to dispense fuel to the fueling station user based on the received authorization data.

18. The system of claim 17, wherein the selection prompt further comprises additional fields configured to receive an input selecting at least one of a quantity of fuel to be dispensed during the selected time slot, a car wash, and a shopping item.

19. The system of claim 18, wherein the selection prompt further comprises a total time prompt characterizing a duration of time of the selected time slot, the duration of time determined based on the selection of the operating parameter and the selection of at least one of the quantity of fuel to be dispensed during the selected time slot, the carwash, and the shopping item.

20. The system of claim 18, wherein the operations further comprise:
receiving updated location data characterizing an updated location of the fueling station user relative to the selected at least one fueling station;
determining an updated arrival time of the fueling station user at the selected at least one fueling station based on the received updated location data, the updated arrival time characterizing an updated time at which the fueling station user is expected to arrive at the selected at least one fueling station;
determining whether a quantity of fuel to be dispensed by the reserved fuel dispenser can be dispensed within the confirmed time slot; and
in response to determining that the quantity of fuel cannot be dispensed by the reserved fuel dispenser within the confirmed time slot, disassociating the reserved fuel dispenser from the fueling station user.

21. The system of claim 17, wherein the operations further comprise:
determining a unique identifier code that characterizes the reserved fuel dispense;
determining a code prompt that includes the unique identifier code and is configured to be presented on the interactive display of the client device; and
providing the code prompt to the interactive display of the client device for depiction thereby.

22. The system of claim 21, wherein the operations further comprise:
providing the unique identifier code to the reserved fuel dispenser; and
in response to determining that the unique identifier code included in the code prompt matches the unique identifier code provided to the reserved fuel dispenser, causing the reserved fuel dispenser to dispense fuel.

23. A non-transitory computer program product storing instructions which, when executed by at least one data processor forming part of at least one computing system, cause the at least one data processor to implement operations comprising:

receiving data characterizing a location of a fueling station user relative to at least one fueling station, a time slot of availability of at least one fuel dispenser at the at least one fueling station during which the at least one fuel dispenser is available to dispense fuel to the fueling station user, and a configuration of the at least one fuel dispenser for fuel dispensing operations;

determining a first view of a graphical user interface (GUI), the first view including a map view of a plurality of selectable fueling stations arranged relative to the location of the fueling station user and including the at least one fueling station;

providing the first view of the GUI on a client device of the fueling station user;

receiving first selection data characterizing a selection of the at least one fueling station selected via the first view of the GUI determining an arrival time of the fueling station user at the selected at least one fueling station based on the received location data, the arrival time characterizing a time at which the fueling station user is estimated to arrive at the selected at least one fueling station;

determining a second view of the GUI, the second view including a selection of time slots corresponding to the arrival time of the fueling station user at the selected at least one fueling station;

providing the second view of the GUI on the client device of the fueling station user;

receiving second selection data characterizing a time slot corresponding to the arrival time of the fueling station user at the selected at least one fueling station, the time slot selected via the second view of the GUI;

determining a selection prompt that characterizes the received fuel dispenser configuration data, the selection prompt including a field for specifying an operating parameter of the at least one fuel dispenser;

providing the selection prompt in the second view of the GUI on the client device of the fueling station user;

receiving third selection data characterizing the operating parameter of the at least one fuel dispenser in response to an input of the operating parameter of the at least one fuel dispenser provided to the field of the selection prompt;

determining an updated second view of the GUI based on the third selection data, the selection of the operating parameter, the updated second view including an indication of a confirmed time slot corresponding to the selected time slot, a duration of the confirmed time slot, and an indication of a reserved fuel dispenser, the updated second view of the GUI determined based on the determined arrival time, the selected time slot, and the selected operating parameter;

providing the updated second view of the GUI on the client device of the fueling station user;

locking the reserved fuel dispenser at a start time of the confirmed time slot;

receiving data characterizing an authorization to dispense fuel from the reserved fuel dispenser, the authorization indicating that the fueling station user has arrived at the reserved fuel dispenser; and enabling the reserved fuel dispenser to dispense fuel to the fueling station user based on the received authorization data.

* * * * *